United States Patent [19]

Kemkers et al.

[11] 3,938,228

[45] Feb. 17, 1976

[54] METHOD OF MAKING A CAPACITOR HOUSING

[75] Inventors: Pieter Kemkers; Antonius Lambertus Derks, both of Eindhoven, Netherlands

[73] Assignee: U.S. Philips Corporation, New York, N.Y.

[22] Filed: Apr. 25, 1975

[21] Appl. No.: 571,539

[30] Foreign Application Priority Data

May 1, 1974 Netherlands.................... 7405803

[52] U.S. Cl. .................. 29/25.42; 29/570; 29/628; 174/52 S; 174/153 R; 317/230; 317/260
[51] Int. Cl.².......................................... H01G 4/32
[58] Field of Search................ 29/628, 25.42, 570; 317/230, 242, 260; 174/50.5, 174/52 S, 174/65 R, 153 R

[56] References Cited

UNITED STATES PATENTS

| 3,336,513 | 8/1967 | LeRoy | 317/230 |
| 3,754,113 | 8/1973 | Bugel | 29/570 |

*Primary Examiner*—Carl E. Hall
*Attorney, Agent, or Firm*—Frank R. Trifari; Daniel R. McGlynn

[57] ABSTRACT

A method of making an electrical terminal in a metal capacitor housing. The terminal includes a metal disc on which a metal pin is eccentrically formed. By means of the pin, a part of an insulating foil inserted between the terminal and the housing is pressed through a hole in the housing, after which the pin is riveted. The foil is removed from the end of the pin, whereby a capacitor electrode can be welded to the pin.

6 Claims, 2 Drawing Figures

METHOD OF MAKING A CAPACITOR HOUSING

The invention relates to a method of providing a metal, electrical terminal in an end face of a cylindrical metal capacitor housing, containing a capacitor body with at least two electrodes, one of the electrodes being electrically connected to the capacitor housing, while the other electrode is electrically connected to the terminal which is electrically insulated from the capacitor housing.

According to a known method of the kind set forth, the terminals are provided in an electrically insulating disc which is fixed in the capacitor housing by making a circumferential groove in the capacitor housing underneath the disc and by peening over the edge of the capacitor housing. The sealing of the capacitor thus obtained is not particularly good, even though sealing is important notably for electrolytic capacitors. Because the terminal in a capacitor housing which is to be unilaterally connected are all provided in the disc, a terminal will have to be made for each electrode of the capacitor body. Consequently, when a number of terminals are to be provided, the disc is mechanically weakened, while the positioning of the terminals in the disc also imposes problems, notably in the case of capacitors having comparatively small end faces.

The invention has for its object to eliminate these drawbacks.

To this end, the invention is characterized in that the end face is made of metal and is at least partly covered by an electrically insulating foil, part of which is pushed through an opening in the end face by means of a pin, after which the foil is removed from the end of the passage pin, also pressed through the opening, which end faces the capacitor body, the electrode being subsequently connected to the terminal.

The invention will be described in detail hereinafter with reference to a drawing which shows a preferred embodiment according to the invention.

Figure 1:
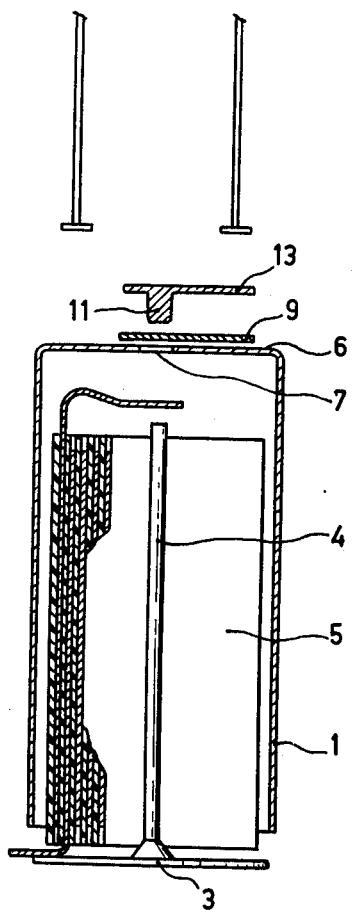
FIG. 1 shows a longitudinal sectional view of the constituent parts of a capacitor according to the invention.
Figure 2:
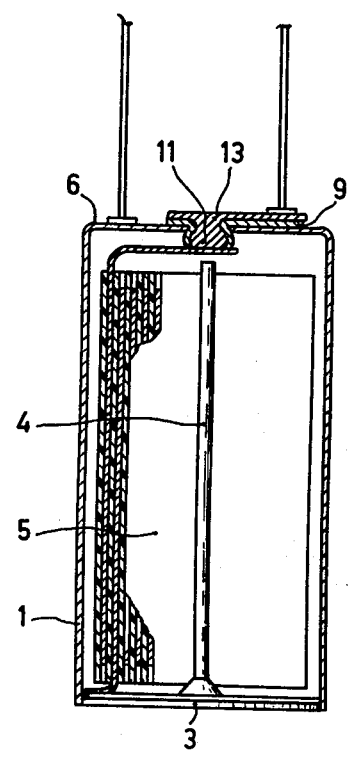
FIG. 2 is a longitudinal sectional view of the assembled capacitor shown in FIG. 1.

The capacitor shown in the FIGS. 1 and 2 comprises a unilaterally open circle-cylindrical capacitor housing 1 of, for example, aluminium, which is closed by an aluminium cover 3. A capacitor wrap 5 is provided about an aluminium pin 4 which is integral with the cover 3. A hole 7 is centrally provided in the bottom 6, a teflon foil 9 being pressed through the hole by means of a metal pin 11 of a terminal 13. The foil 19 electrically insulates the terminal 13 from the capacitor housing 1. The terminal 13 is preferably connected to the bottom 6 by rivetting pin 11. Very good sealing is thus obtained. Proper sealing is also obtained by fixing the pin 11 in the bottom 6 by way of a press fit. The foil 9 is removed from the end of the pin 11 which faces the cover side of the capacitor 1, for example, by grinding, after which an electrode of the capacitor wrap 5, meanwhile fitted in the capacitor housing 1, is electrically connected to the bared end of the pin 11 by using the pin 4 and the terminal 13 as a welding electrode. Subsequently, the second electrode is welded, via a metal strip which is electrically connected thereto, between the lid 3 and the housing 1, simultaneously with the welding down of the cover 3 on the housing 1.

It is alternatively possible to connect the second electrode electrically to the pin 4. The additional metal strip, required for electrically connecting the second electrode to the housing 1, can then be dispensed with.

In a further embodiment according to the invention the terminal is provided in a hole of the loose cover, rather than in the end face which forms part of the capacitor housing and the terminal is electrically insulated from the cover in the described manner. In this embodiment the capacitor wrap is fixed in the capacitor housing in known manner, one electrode being welded to the terminal in the cover of the housing, the other electrode being welded between the cover and the capacitor housing, simultaneously with the welding of the cover in the capacitor housing. If desired, the terminal can already be provided in a metal band, wherefrom the cover is punched at a later stage. It is also possible to shape the foil in a matrix comprising a pin-shaped die and a heated or non-heated die cushion.

A rubber or teflon foil is preferably used for the foil. Generally, any electrically insulating foil which can be properly deep-drawn can be used. It is alternatively possible to cause the foil to be torn when it is pressed through the hole by the pin, by weakening the foil, prior to fitting, at the location where the end of the pin contacts the foil. The operation of removing the foil from the end of the pin is eliminated by the tearing of the foil.

When the pin is eccentrically formed on the terminal, a capacitor can be manufactured in one mechanical operation, which capacitor has either the two connections eccentrically connected to one end face of the capacitor or one connection centrically connected to the two end faces of the capacitor.

The method according to the invention can be very advantageously used in capacitors having comparatively small surface areas, such as electrolytic or non-electrolytic wrap and folding capacitors.

What is claimed is:

1. A method of providing a metal, electrical terminal in an end face of a cylindrical metal capacitor housing, containing a capacitor body with at least two electrodes, one of the electrodes being electrically connected to the capacitor housing, the other electrode being electrically connected to the terminal electrically insulated from the capacitor housing, comprising the steps of
   providing a capacitor housing end face made of metal and at least partly covered by an electrically insulating foil;
   pushing a portion of said foil through an opening in said end face by means of a pin, thereby providing said terminal through and insulated from said end face;
   removing said foil from the end of the pin pressed through said opening; and
   connecting one of said electrodes to said terminal.

2. A method as claimed in claim 1, wherein said terminal includes a disc having a pin eccentrically formed thereon.

3. A method as claimed in claim 1 further comprising the step of riveting said terminal in the capacitor housing.

4. A method as claimed in claim 1, further comprising the step of inserting a teflon foil between said terminal and said capacitor housing.

5. A method as claimed in claim 1 further comprising the step of inserting a rubber foil between said terminal and said capacitor housing.

6. A method as claimed in claim 1 wherein said foil is weakened at the area where the foil covers the tip of said pin.

* * * * *

UNITED STATES PATENT AND TRADEMARK OFFICE
CERTIFICATE OF CORRECTION

PATENT NO. : 3,938,228
DATED : February 17, 1976
INVENTOR(S) : PIETER KEMKERS ET AL It is certified that error appears in the above-identified patent and that said Letters Patent are hereby corrected as shown below:

Column 1, line 53, change "19" to read --9--;

Signed and Sealed this

Twenty-ninth Day of November 1977

[SEAL]

Attest:

RUTH C. MASON
Attesting Officer

LUTRELLE F. PARKER
Acting Commissioner of Patents and Trademarks